June 20, 1961
S. RUBIN
2,988,921
DYNAMIC FORCE MEASURING DEVICE
Filed May 31, 1957
5 Sheets-Sheet 1
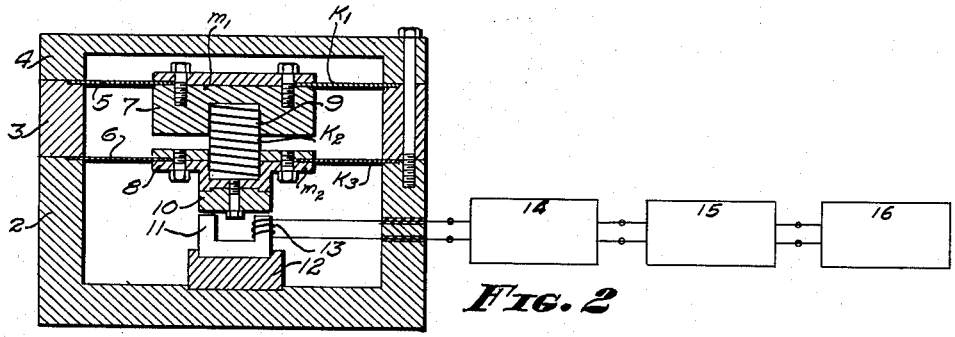
FIG. 2
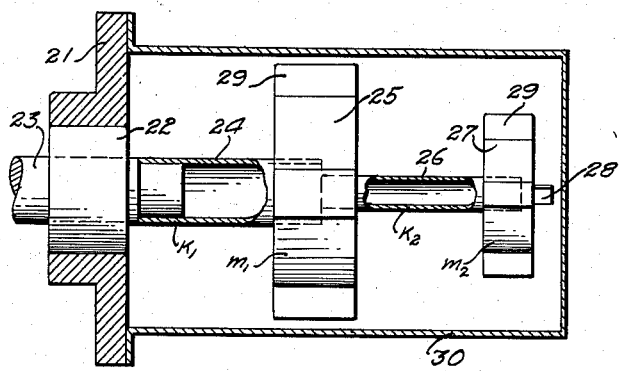
FIG. 3
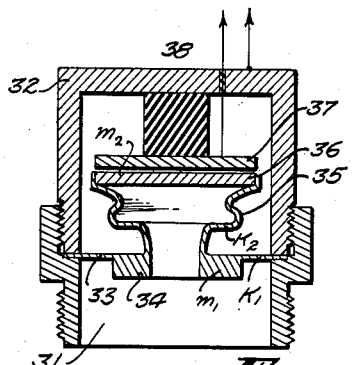
FIG. 4
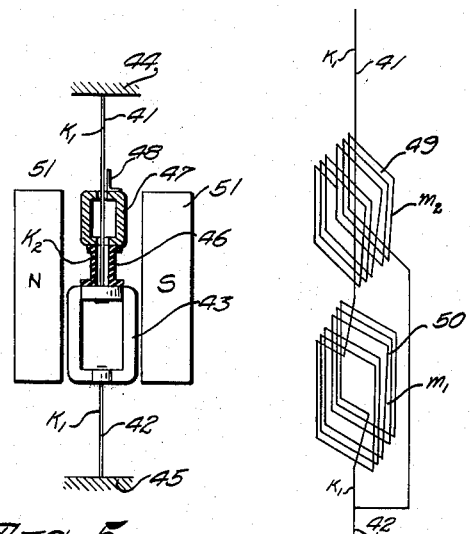
FIG. 5    FIG. 6    FIG. 1
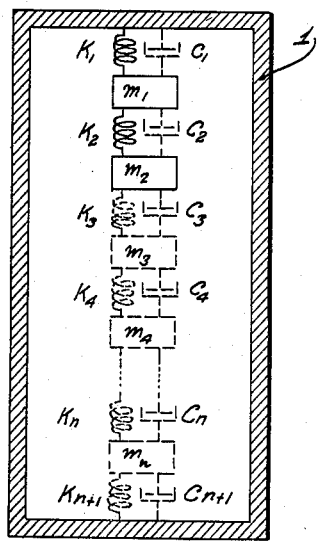
INVENTOR.
SHELDON RUBIN
BY
Lyon + Lyon
ATTORNEYS

United States Patent Office 2,988,921
Patented June 20, 1961

2,988,921
DYNAMIC FORCE MEASURING DEVICE
Sheldon Rubin, Los Angeles, Calif., assignor to California Institute Research Foundation, Pasadena, Calif., a corporation of California
Filed May 31, 1957, Ser. No. 663,863
9 Claims. (Cl. 73—517)

This invention relates to a dynamic force measuring device and included in the objects of this invention are:

First, to provide a device which utilizes a unique two or multiple degree of freedom system whereby sensitivity to the dynamic force to be measured is substantially increased as compared to a single degree of freedom system of equal useful frequency range, or equivalently whereby the frequency range through which a particular embodiment may be designed to operate accurately is substantially increased as compared to a single degree of freedom system of equal sensitivity.

Second, to provide a device for measurement of dynamic forces which measures the force directly, and may be adapted to the measurement of mechanical forces of either a linear or torsional nature and thus be essentially an accelerometer, or measure dynamic pressures, or measure dynamic electrical variables.

With the above and other objects in view as may appear hereinafter, reference is directed to the accompanying drawings, in which:

FIGURE 1 is a diagrammatical view indicating a multiple degree of freedom system to illustrate the principle which is utilized in the dynamic force measuring device.

FIGURE 2 is a substantially diagrammatical transverse sectional view of a linear accelerometer utilizing a two degree of freedom movement system, and indicating by block diagram an associated electrical system for indicating or recording the operation of the accelerometer.

FIGURE 3 is a substantially diagrammatical transverse sectional view of a torsional accelerometer utilizing a two degree of freedom movement.

FIGURE 4 is a substantially diagrammatical transverse sectional view of a two degree of freedom system for the measurement of dynamic pressures.

FIGURE 5 is a substantially diagrammatical view partially in section of an adaptation of the dynamic force measuring device to the measurement of dynamic electrical forces.

FIGURE 6 is a diagrammatical view showing the moving coils in FIGURE 5 and their electrical connection.

Figure 7:
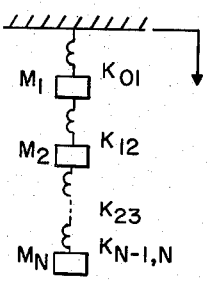
FIGURE 7 is a diagrammatical view illustrating a multi-degree of freedom seismic system.

Reference is directed to FIGURE 1 which illustrates a multiple degree of freedom system represented diagrammatically as a rigid frame or case 1 in which the components of the system are separated into a series of masses represented by $m_1$, $m_2$, etc., a series of elastic elements designated by linear spring constants $k_1$, $k_2$, etc., and damping coefficients $c_1$, $c_2$, etc. Thus, for the purposes of illustration the masses are indicated as rectangular blocks series connected by springs symbolic of the spring constants, and by dash-pots symbolic of the damping coefficients. As will be seen, the minimum number of elements are at least two masses $m_1$ and $m_2$ and at least two elastic elements $k_1$ and $k_2$ connecting the masses in series, these being indicated by solid lines; whereas the additional elements to constitute a multi-degree of freedom system are indicated by broken lines. In most cases, too, some degree of damping is essential and may be inherent in the masses or springs.

Mathematically this system as shown in FIGURE 1 may be considered as follows:

$$m_1\frac{d^2Z_1}{dt^2}+c_1\frac{dZ_1}{dt}+k_1Z_1+c_2\left(\frac{dZ_1}{dt}-\frac{dZ_2}{dt}\right)+k_2(Z_1-Z_2)=f_1$$

$$m_2\frac{d^2Z_2}{dt^2}+c_2\left(\frac{dZ_2}{dt}-\frac{dZ_1}{dt}\right)+k_2(Z_2-Z_1)$$
$$+c_3\left(\frac{dZ_2}{dt}-\frac{dZ_3}{dt}\right)+k_3(Z_2-Z_3)=f_2$$

or generally $$m_n\frac{d^2Z_n}{dt^2}+c_n\left(\frac{dZ_n}{dt}-\frac{dZ_{n-1}}{dt}\right)+k_n(Z_n-Z_{n-1})$$
$$+c_{n+1}\left(\frac{dZ_n}{dt}-\frac{dZ_{n+1}}{dt}\right)+k_{n+1}(Z_n-Z_{n+1})=f_n$$

where $m_n$=mass of weight $m_n$
$Z_n$=relative displacement of $m_n$
$t$=time
$c_n$=damping coefficient
$k_n$=spring constant of n'th spring
and
$f_n$=force applied to weight $m_n$ Reference is now directed to the following analysis of the multiple degree of freedom system as applied to accelerometers:

MULTIPLE DEGREE OF FREEDOM ACCELEROMETER

It has been determined that the optimum steady-state accelerometer characteristics for transient as well as periodic motions are the flat amplitude and linear phase shift characteristics. This will insure that the motion will be reproduced sufficiently well to allow accurate determination of peak structural response from the recorded acceleration-time history. Having the optimum conditions for a single degree of freedom system, it is now logical to consider a more complex system to see if improvement in overall characteristics can be attained.

Taylor "Accelerometers for Determining Aircraft Flight Loads." Engineering (Apr. 11, 1952), vol. 173, No. 4498, 473–475 and Manildi "Analysis and Design of a Spring Coupled Accelerometer." Journal of the Instrument Society of America (Aug. 1954), vol. 1, No. 8, 26–30 have treated a specific example of a two degree of freedom system for use as an improved accelerometer. They considered an ordinary simple seismic system, spring coupled to a rotary mass. In both treatments only the rotary mass was damped and the instrument output was proportional to the angular position of the rotary mass.

Taylor's analysis aimed at increasing the rate of cutoff of the amplitude characteristic of the system to increase its effectiveness as low-pass filter. He considered both the amplitude and phase response of the system, varying the parameters until the best design was obtained.

Manildi showed three types of improvement over the conventional single degree of freedom design. The first was an increase of the "flat response" range with respect to the natural frequency of the non-rotary spring-mass system in the two degree of freedom accelerometer. Secondly the rate of cutoff was increased. Finally, the system was shown to be a better filter at high frequencies. It was indicated that the amplitude characteristic falls off as the fourth power of frequency of harmonic excitation, instead of the second power as it does for the single degree of freedom instrument. These studies show that the additional parameters of a multiple degree of freedom system can be used to improve its characteristics as an accelerometer.

These previous studies confined themselves to a particular combination of a linear and a rotary element. It is the object of the present work to investigate a more general theory of the multiple degree of freedom system as an accelerometer. The single degree of freedom system has a sensitivity of $G(\omega)/P^2$ (displacement per unit acceleration), where $G(\omega)=1$ at zero frequency. As shown above, the static sensitivity can be maintained over a large frequency range by the use of proper damping. In the multiple degree of freedom case $\Gamma(\omega)P_1^2$ shall be used for the acceleration sensitivity. The static sensitivity is then $\Gamma_0/P_1^2$, where $\Gamma_0$ is $\Gamma(0)$ and $P_1$ is the first natural frequency. In the multiple degree of freedom case, as in the single degree of freedom system, damping will be introduced to extend the static sensitivity to as large a range as possible.

To gain an insight into the general features of the problem, an electric analog system of a two mass mechanical oscillator was set up and the damping coefficients were adjusted to maximize the region of flat response. It was experimentally observed that the obtainable length of the flat amplitude characteristic was principally determined by the first natural frequency. Thus a logical approach is to first maximize the static sensitivity $\Gamma_0$, treating an undamped system, and then to introduce damping into the system to maximize the region of flat amplitude and linear phase shift. This approach limits the number of parameters that must be considered at one time.

A. Static sensitivity

Consider the spring-mass system shown in Fig. 7. The absolute displacement of the $i$th mass is denoted by $x_i$. Applying Newton's Second Law of Motion, the equations of motion for the masses are $$m_1\ddot{x}_1 + k_{01}(x_1 - y) + k_{12}(x_1 - x_2) = 0$$

$$m_2\ddot{x}_2 + k_{12}(x_2 - x_1) + k_{23}(x_2 - x_3) = 0$$

$$\vdots$$

$$m_i\ddot{x}_i + k_{i-1,i}(x_i - x_{i-1}) + k_{i,i+1}(x_i - x_{i+1}) = 0$$

$$\vdots$$

$$m_n\ddot{x}_n + k_{n-1,n}(x_n - x_{n-1}) = 0$$

If the relative displacements between the masses and the base are denoted by Z, so that $Z_i = X_i - y$, the equations become $$m_1\ddot{Z}_1 + k_{01}Z_1 + k_{12}(Z_1 - Z_2) = -m_1\ddot{y}$$

$$m_2\ddot{Z}_2 + k_{12}(Z_2 - Z_1) + k_{23}(Z_2 - Z_3) = -m_2\ddot{y}$$

$$\vdots$$

$$m_i\ddot{Z}_i + k_{i-1,i}(Z_i - Z_{i-1}) + k_{i,i+1}(Z_i - Z_{i+1}) = -m_i\ddot{y}$$

$$\vdots$$

$$m_n\ddot{Z}_n + k_{n-1,n}(Z_n - Z_{n-1}) = -m_n\ddot{y} \quad (3)$$

Letting $$y(t) = Y \sin \omega t, \; z_i = Z_i \sin \omega t$$

is obtained under steady-state conditions. The following matrix equation describes this steady-state excitation.

$$\begin{bmatrix} k_{01}+k_{12}-m_1\omega^2 & -k_{12} & 0 & \cdots & 0 \\ -k_{12} & k_{12}+k_{23}-m_2\omega^2 & -k_{23} & \cdots & 0 \\ 0 & -k_{23} & k_{23}+k_{34}-m_3\omega^2 & \cdots & 0 \\ \vdots & & & & \vdots \\ 0 & 0 & 0 & \cdots & k_{n-1,n} \end{bmatrix} \begin{Bmatrix} Z_1 \\ Z_2 \\ Z_3 \\ \vdots \\ Z_n \end{Bmatrix} = -\omega^2 Y \begin{Bmatrix} m_1 \\ m_2 \\ m_3 \\ \vdots \\ m_n \end{Bmatrix}.$$

(4)

This equation may be written in the abbreviated form $$([K]-[M]\omega^2)\{Z\} = \{m\}A \quad (4)$$

where $$[K] = \begin{bmatrix} k_{01}+k_{12} & -k_{12} & 0 & \cdots & 0 \\ -k_{12} & k_{12}+k_{23} & -k_{23} & \cdots & 0 \\ 0 & -k_{23} & k_{23}+k_{34} & \cdots & 0 \\ \vdots & & & & \vdots \\ 0 & 0 & 0 & \cdots & k_{n-1,n} \end{bmatrix}$$

$$[M] = \begin{bmatrix} m_1 & 0 & 0 & \cdots & 0 \\ 0 & m_2 & 0 & \cdots & 0 \\ 0 & 0 & m_3 & \cdots & 0 \\ \vdots & & & & \vdots \\ 0 & 0 & 0 & \cdots & m_n \end{bmatrix}, \{Z\} = \begin{Bmatrix} Z_1 \\ Z_2 \\ Z_3 \\ \vdots \\ Z_n \end{Bmatrix}, \{m\} = \begin{Bmatrix} m_1 \\ m_2 \\ m_3 \\ \vdots \\ m_n \end{Bmatrix}, A = -\omega^2 Y.$$

The characteristic equation for the determination of the natural frequencies of the system is $$|[K]-[M]\omega^2| = 0 \quad (5)$$

For cases of practical interest this determinant will have $n$ distinct, positive solutions $p_i^2 (i=1, 2, \ldots n)$. Hence it must be possible to write the determinant in the equivalent form $$|[K]-[M]\omega^2| = a(\omega^2 - p_1^2)(\omega^2 - p_2^2) \ldots (\omega^2 - p_n^2)$$

Since the $\omega^{2n}$ term in the expansion of Equation 5 comes from the product of the diagonal terms, we see that $a = m_1 m_2 \ldots m_n$. Thus $$|[K]-[M]\omega^2| = \prod_{i=1}^{n} m_i(\omega^2 - p_i^2) \quad (6)$$

In particular for $\omega = 0$.

$$|K| = (-1)^n \prod_{i=1}^{n} m_i p_i^2 \quad (7)$$

If this system is to be used as an accelerometer, taking the relative displacement of the $n$th mass ($Z_n$) as the response quantity, we must solve for the output per unit acceleration under static conditions. We have denoted this by $\Gamma_0/p_1^2$ which must equal $Z_n/A$ at $\omega=0$. Solving Equation 4 we have $$|K|\frac{Z_n}{A}\bigg|_{\omega=0} = |K|\frac{\Gamma_0}{p_1^2} = \begin{vmatrix} k_{01}+k_{12} & -k_{12} & 0 & \ldots & m_1 \\ -k_{12} & k_{12}+k_{23} & -k_{23} & \ldots & m_2 \\ 0 & -k_{23} & k_{23}+k_{34} & \ldots & m_3 \\ \vdots & & & & \vdots \\ 0 & 0 & 0 & \ldots & m_n \end{vmatrix} \quad (8)$$

It will now be shown that the determinant on the right hand side of Equation 8 is exactly equal to the negative of the coefficient of $\omega^2$ in the expansion of the characteristic Equation 5. In a determinant, any column may be added to another column without changing the value of the determinant. If in the determinant of Equation 5 each of the first $n-1$ columns is added to the $n^{th}$ column, the equation has the form $$\begin{vmatrix} k_{01}+k_{12}-m_1\omega^2 & -k_{12} & 0 & \ldots & -m_1\omega^2+k_{01} \\ -k_{12} & k_{12}+k_{23}-m_2\omega^2 & -k_{23} & \ldots & -m_2\omega^2 \\ 0 & -k_{23} & k_{23}+k_{34}-m_3\omega^2 & \ldots & -m_3\omega^2 \\ \vdots & & & & \vdots \\ 0 & 0 & 0 & \ldots & -m_n\omega^2 \end{vmatrix} = 0$$

It is noted that all terms in the last column contain an $\omega^2$ factor except for the $k_{01}$ term in the first row. The coefficient of the $\omega^2$ term in the expansion of this determinant by $n^{th}$ column without the $k_{01}$ term is clearly seen to be equal to the negative of the right hand side of Equation 8. It can be readily shown that the $k_{01}$ term produces no $\omega^2$ terms in the expansion. Thus it has been shown that $-|k|\Gamma_0/p_1^2$ equals the coefficient of $\omega^2$ in the characteristic equation.

In the expansion of the characteristic equation in the form $$\prod_{i=1}^{n} m_i(\omega^2 - p_i^2) = 0$$

the coefficient of $\omega^2$ is equal to $$(-1)^{n+1} \prod_{i=1}^{n} m_i$$

times the sum of all possible products of the $p_i^2$ values taken $n-1$ at a time. Symbolically this coefficient is $$(-1)^{n+1}\left(\prod_{k=1}^{n} m_k\right)\sum_{j=1}^{n}\left(\prod_{i=1,2,\ldots,j-1,j+1,\ldots,n} p_i^2\right) \text{ for } n>1$$

A special case occurs at $n=1$, where this is equal to $m_1p_1^2$. For $n=2$, this gives $-m_1m_2(p_1^2+p_2^2)$; for $n=3$, $m_1m_2m_3(p_1^2p_2^2+p_1^2p_3^2+p_2^2p_3^2)$; and so on. Equating this coefficient to $-|k|\Gamma_0/p_1^2$, and using Equation 7

$$\frac{\Gamma_0}{p_1^2} = \frac{1}{p_1^2} + \frac{1}{p_2^2} + \frac{1}{p_3^2} + \ldots + \frac{1}{p_n^2}$$

or $$\Gamma_0 = 1 + \frac{p_1^2}{p_2^2} + \frac{p_1^2}{p_3^2} + \ldots + \frac{p_1^2}{p_n^2} \quad (9)$$

Obviously the $n^{th}$ order system shown in FIG. 7 is not the most general type. No springs between non-adjacent masses and no springs to the base (except for $m_1$) are included. It so happens that if any of these terms are included, negative quantities containing these spring constants will appear in the quantity $\Gamma_0$. However it is desired to maximize $\Gamma_0$ and these negative terms would decrease its value. From this consideration the choice of the form for the system shown in FIG. 7 as the optimum form of seismic system can be justified.

Figure 8:
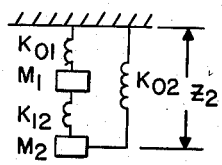
FIGURE 8 is a similar diagrammatical view illustrating a two degree of freedom seismic system.

As an example of the form of these negative terms due to other springs, consider the system of FIG. 8. Using $Z_2$ for the response quantity, the sensitivity is $$\Gamma_0 = 1 + \frac{p_1^2}{p_2^2} - \frac{k_{02}}{m_2 p_2^2}$$

Thus if two systems have the same set of natural frequencies, one with the springs indicated in FIG. 7 and the other containing some other springs, the type of FIG. 7 will have the higher static sensitivity to acceleration.

The quantity $\Gamma_0$ is then a factor of merit for the accelerometer. The larger its value, the more output per unit acceleration will be obtained for equal first natural frequencies. $\Gamma_0 = G(0) = 1$ for the one degree of freedom system. For a two degree of freedom system, the value of $\Gamma_0 = 2$ will be approached as $P_2^2 \to P_1^2$. It can be shown that to make $p_2^2/p_1^2$ have a value near one in a two degree of freedom system, the following should be true:

$$\frac{k_{01}}{m_1} = \frac{k_{12}}{m_2}, \quad m_2 \ll m_1$$

Figure 9:
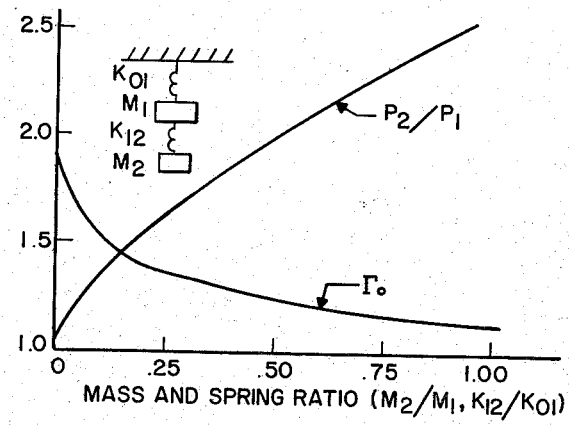
FIGURE 9 is a chart and diagrammatical view illustrating the static level of amplitude characteristic and natural frequency ratio for two degree of freedom system.

A plot of how $\Gamma_0$ and $p_2/p_1$ vary with the parameter $m_2/m_1$, which equals $k_{12}/k_{01}$, is shown in FIG. 9.

Figure 10:
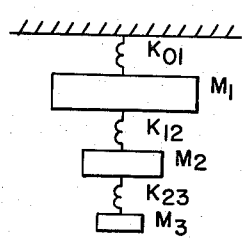
FIGURE 10 is a diagrammatical view illustrating a tapered multi-degree of freedom seismic system.

The results indicated by this figure can be extended to the $n$ degree of freedom system. In FIG. 10, if we let $$\frac{k_{01}}{m_1} = \frac{k_{12}}{m_2} = \frac{k_{23}}{m_3} = \ldots = P^{*2}$$

and $$\frac{m_{i+1}}{m_i} \ll 1$$

each of the $k_{i-1,i}/m_i$ systems has the same natural frequency $P^*$, and is only negligibly affected by the systems below it. The result is that the natural frequencies of the system taken as a whole are close together, which gives rise to a large value of $\Gamma_0$ (Eq. 9).

For example with $n=2$, if $$P^{*2} = \frac{k_{01}}{m_1} = \frac{k_{12}}{m_2} \text{ and } \frac{m_2}{m_1} = \frac{k_{12}}{k_{01}} = \epsilon$$

the characteristic equation becomes $$P^4 - (2+\epsilon)p^{*2}p^2 + p^{*4} = 0 \quad (10)$$

The solution is $$p^2 = \left[1 + \frac{\epsilon}{2} \pm \left(\epsilon + \frac{\epsilon^2}{4}\right)^{1/2}\right] p^{*2}$$

For $\epsilon \ll 1$, $$p^2 \approx (1 \pm \epsilon^{1/2})p^{*2}$$

and hence $$\frac{p_1^2}{p_2^2} \approx \frac{1-\epsilon^{1/2}}{1+\epsilon^{1/2}} \approx 1 - 2\epsilon^{1/2}$$

with the result that $$\Gamma_0 = 1 + \frac{p_1^2}{p_2^2} \approx 2(1 - \epsilon^{1/2}), \quad \epsilon \ll 1$$

This same analysis could be applied to larger values of $n$, with the result that $$\lim_{\frac{m_{i+1}}{m_i} \to 0} \Gamma_0 = n$$

where $$\frac{k_{01}}{m_1} = \frac{k_{12}}{m_2} = \ldots$$

Figure 11:
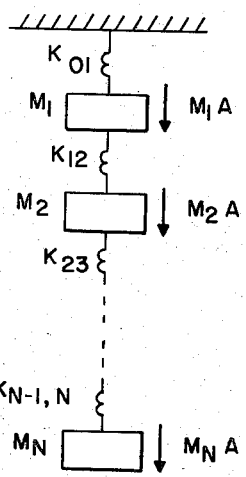
FIGURE 11 is a diagrammatical view illustrating a further development of the multi-degree of freedom seismic system.

A way of viewing this limiting value for $\Gamma_0$ is as follows: knowing that a base acceleration $A$ can be replaced by forces at the masses such that the force on $m_i$ is $m_iA$, we can replace $A$ with the loading shown in FIG. 11. Now if the sum of the forces acting below any mass $m_i$ is negligible compared to the external force $m_iA$, the displacement $$Z_i - Z_{i-1} = \frac{m_i A}{k_{i-1,i}}$$

Then given that $$\frac{k_{i-1,i}}{m_i} = P^{*2}$$

the displacement between any two adjacent masses is $A/p^{*2}$ and $p_1 = p^*$. These displacements add algebraically until a value $nA/p^{*2}$ is attained for the displacement between $m_n$ and the base. Thus the sensitivity is $nA/p^{*2}$ and $\Gamma_0$ is $n$.

Figure 12:
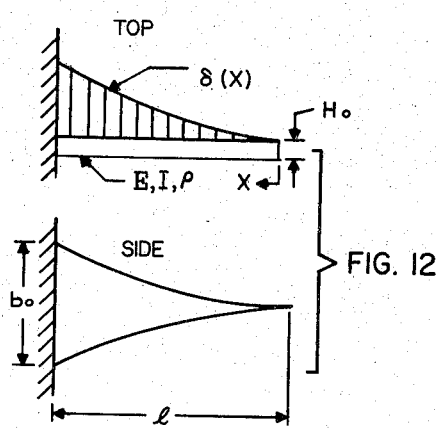
FIGURE 12 is a diagrammatical view illustrating a tapered cantilever beam.

In practice it is not possible to achieve the limit of $\Gamma_0 = n$ since this requires an infinite rate of taper ($\epsilon = 0$). For $n=2$ the rate of approach to this limit is given in FIG. 9. It is seen that a significant gain can be obtained for a reasonable taper. For example, a gain of 53 percent is obtained for $\epsilon = 0.1$. It may be of interest to consider the effect of a taper on $\Gamma_0$ for a distributed system. As an example consider the case of the bending on a cantilever beam with a constant height $h_0$ and a variable width $b(x) = b_0(x/l)^n$, loaded by a unit of acceleration (see FIG. 12). The previous analysis was made for a system governed by a second order differential equation, whereas the first order beam deflection is the solution of a fourth order differential equation. However the concept of using a tapered system to bring the natural frequencies closer together in order to obtain greater values of $\Gamma_0$ still may be valid.

In this case $\Gamma_0/P_1^2$ is the static deflection per unit acceleration at the end of the beam, where $P_1$ is the first natural frequency. The differential equation for the beam displacement is $$\frac{d^2}{dx^2}\left(EI\frac{d^2y}{dx^2}\right) = q(x) \quad (11)$$

Now $$q(x) = \rho b_0 h_0 (x/l)^n$$

$$I(x) = \frac{b_0 h_0^3}{12}(x/l)^n$$

The solution for the deflection at the end is $$y(0) = \frac{\rho l^4}{E h_0^2} \frac{3}{(n+1)(n+2)} \quad (12)$$

per unit acceleration.

Figure 13:
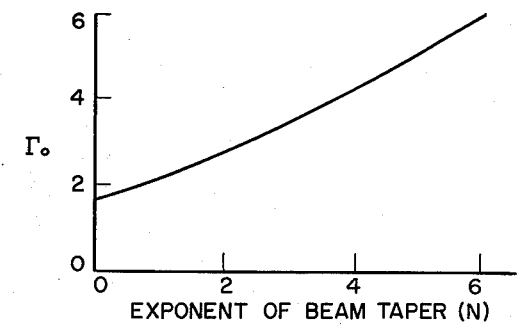
FIGURE 13 is a chart illustrating the static level of amplitude characteristic for tapered cantilever beam.

Using the Rayleigh-Ritz Lord Rayleigh Theory of Sound, 1st American ed., vols. I and II. New York: Dover, 1945, or energy method of obtaining the lowest natural frequency (5, pg. 352), $\Gamma_0$ may be computed as $y(0)P_1^2$. FIG. 13 is a plot of $\Gamma_0$ as a function of the parameter $n$. Theoretically large values $\Gamma_0$ could be attained for large $n$. However the practical limitation of an extremely thin section at the end of the beam limits the extent to which one may go. Other effects due to the inadequacy of the simple approach used in the calculations and the inadequacy of the differential equation will become significant for large $n$. Something between the linear tapered beam ($n=1$) and the parabolic taper ($n=2$) appears quite feasible, so that a value of $\Gamma_0$ equal to approximately 2.5 is certainly attainable. The beam would then produce a displacement, under a unit static acceleration loading, of 2.5 times that of a one degree of freedom system under the same loading, and having a natural frequency equal to the lowest natural frequency of the beam.

B. Useful frequency range

Figure 14:
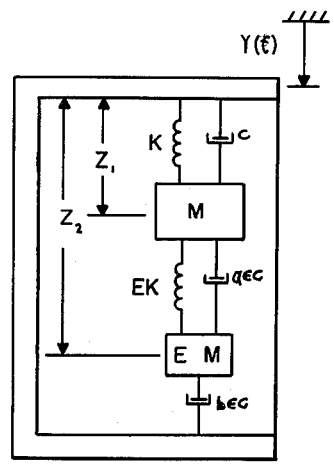
FIGURE 14 is a diagrammatical view of a two degree of freedom accelerometer.

With the form of the undamped mechanical system required to maximize the static acceleration sensitivity determined, damping may now be inserted into this system to increase the useful range of accelerometer operation. From a practical aspect, the simplest design resulting in significant improvement is desired. Hence the two degree of freedom system shown in FIG. 14 will be considered.

The equations of motion may be written in the form $$m\ddot{Z}_1 + c\dot{Z}_1 + kZ_1 + a\epsilon c(\dot{Z}_1 - \dot{Z}_2) + \epsilon k(Z_1 - Z_2) = -m_1\ddot{y} \quad (13)$$

$$\epsilon m\ddot{Z}_2 + b\epsilon c\dot{Z}_2 + a\epsilon c(\dot{Z}_2 - \dot{Z}_1) + \epsilon k(Z_2 - Z_1) = -m_2\ddot{y}$$

With an excitation of the form $-\ddot{y}(t) = A\exp(i\omega t)$, the steady-state solutions may be presented as $$z_1 = Z_1 \exp[i(\omega t + \phi_1)]$$
$$z_2 = Z_2 \exp[i(\omega t + \phi_2)]$$

With these substitutions the accelerometer response is $$Z_2 \exp(i\phi_2) = \frac{(2+\epsilon-\eta^2) + i2\beta\eta(1+a+a\epsilon)}{[(1-\eta^2)+i2\beta\eta(a+b)][(1+\epsilon-\eta^2)+i2\beta\eta(1+a\epsilon)] - \epsilon[1+i2\beta\eta a]^2} \frac{1}{P_0^2} \quad (14)$$

where $$P_0^2 = \frac{k}{m}, \quad \beta = \frac{c}{2(km)^{1/2}}, \quad \eta = \frac{\omega}{P_0}$$

The amplitude characteristic is given by $$\Gamma(\omega) = Z_2(\omega)P_1^2$$

hence $$\Gamma = \left\{\frac{M^2 + N^2}{L^2 + Q^2}\right\}^{1/2} \frac{P_1^2}{P_2^2} \quad (15)$$

and the phase angle is $$\phi_2 = \tan^{-1} \frac{LN - MQ}{LM + NQ} \quad (16)$$

where $M = 2 + \epsilon - \eta^2$
$N = 2\beta\eta(1 + a + a\epsilon)$
$L = (1-\eta^2)^2 - 4\beta^2\eta^2(a+b+ab\epsilon) - \epsilon\eta^2$
$Q = 2\beta\eta[(1-\eta^2)(1+a+b+ab\epsilon) + \epsilon(b-a)]$ It is intended that a large flat region in the amplitude characteristic be obtained. Hence, as a first step, the relation among $a$, $b$, and $c$ to give a zero value for $d^2\Gamma/d\eta^2$ at $\eta=0$ must be found. The odd derivatives at $\eta=0$ do not exist. This procedure gave $\beta=0.707$ for the single degree of freedom system. The corresponding value of $\beta$ for the two degree of freedom system is $$\beta^* = \left\{\frac{(2+\epsilon)[(2+\epsilon)^2 - 1]}{2(2+\epsilon)^2[(1+a+b+ab\epsilon)^2 - 2(a+b+ab\epsilon)] - 2(1+a+a\epsilon)^2}\right\}^{1/2} \quad (17)$$

For any choice of $a$ and $b$, this relation yields the value of $\beta$ or $c$ resulting in an initially flat amplitude characteristic. If amplitude characteristics corresponding to various combinations of $a$, $b$, and $\beta^*$ are plotted, one finds both longer and shorter flat ranges than one obtains for the single degree of freedom case.

In order to find those systems having superior amplitude characteristics, one may also set $d^4\Gamma/d\eta^4 = 0$ at $\eta = 0$ for $\beta = \beta^*$. The condition for this to be true is $(2+\epsilon)^2\{2+(2+\epsilon)^2 - 8\beta^{*2}[1+(a+b)^2 + (a^2+b^2)\epsilon - 2\beta^{*2}(a+b+ab\epsilon)^2]\} = 1 \quad (18)$ The solutions of Equations 17 and 18 may be given in the form of a family of curves, $a^*$ versus $b^*$, with the parameter $\epsilon$. This appears in FIG. 15. Any combination of $a^*$ and $b^*$ on one of these curves, with the corresponding value of $\beta^*$, results in an amplitude characteristic which may be expressed in a Maclaurin series in $\eta^* = \omega/P_1$.

$$\Gamma(\eta^*) - \Gamma(0) = \frac{\eta^{*6}}{6!} \left.\frac{d^6\Gamma}{d\eta^{*6}}\right|_{\eta=0} + \frac{\eta^{*8}}{8!} \left.\frac{d^8\Gamma}{d\eta^{*8}}\right|_{\eta=0} + \ldots$$

Figure 15:
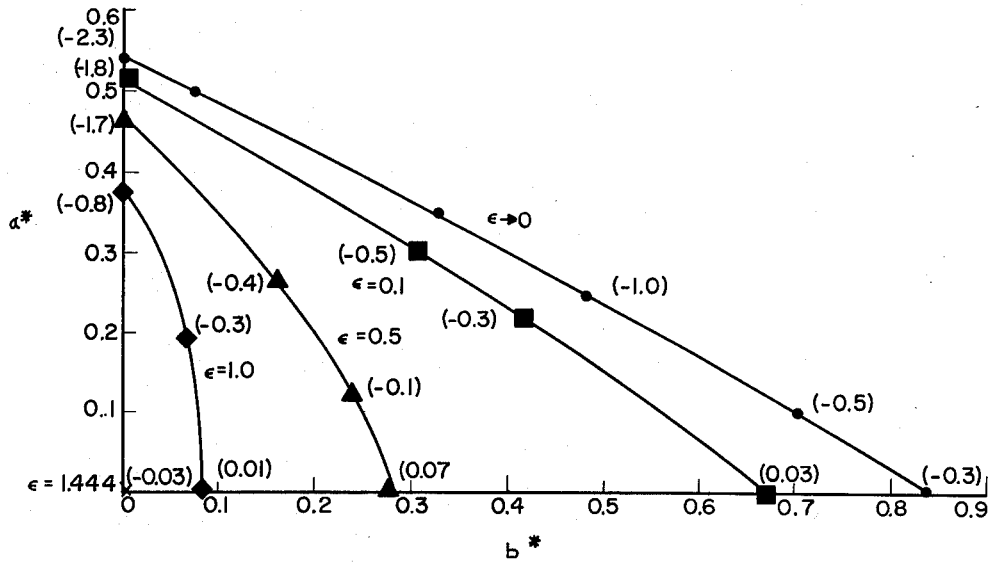
FIGURE 15 is a chart indicating damping parameters for two degree of freedom accelerometer.

Among the possibilities described by the curves in FIG. 15, those having small values for the coefficient of $\eta^{*6}$ in the above expression will have longer flat ranges. The values of this quantity appear in FIG. 15 as bracketed numbers near the points to which they correspond. The values for $a^*=0$ are seen to be small, in general, compared to the values for the other points. Combining the notion that it is desirable from a practical viewpoint to have one damping parameter zero and the fact that one wishes the flattest amplitude characteristic, subsequent considerations will be confined to those points for which $a^*=0$ and $b=b^*$.

Figure 16:
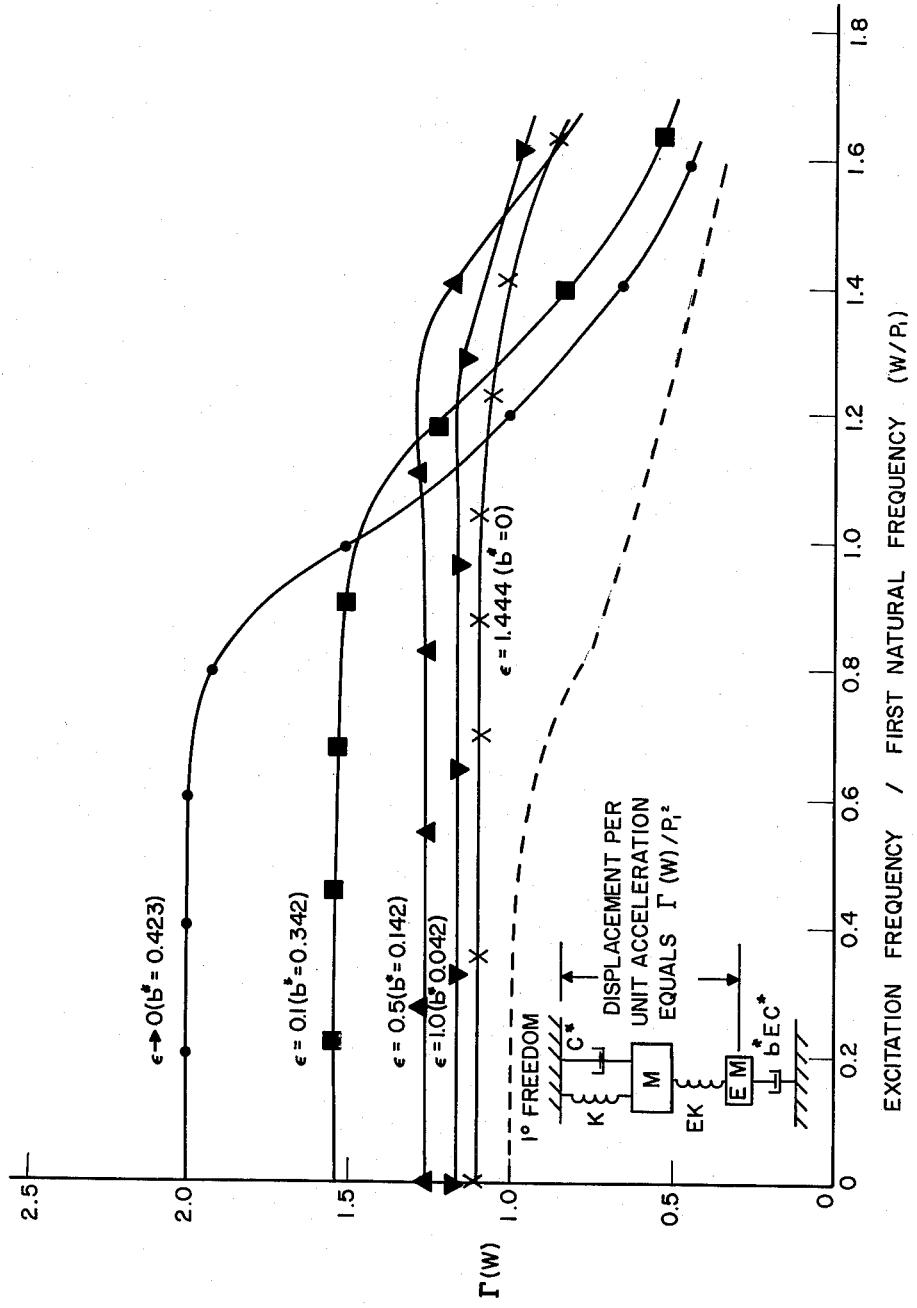
FIGURE 16 is a chart indicating the amplitude characteristics for two degree of freedom accelerometer.
Figure 17:
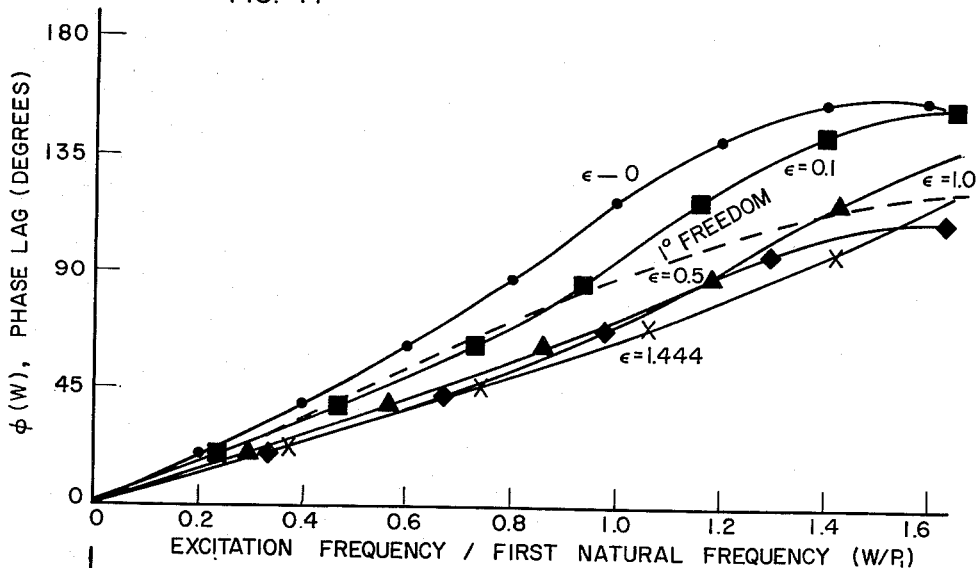
FIGURE 17 is a chart indicating phase shift characteristics for two degree accelerometer.
Figure 18:
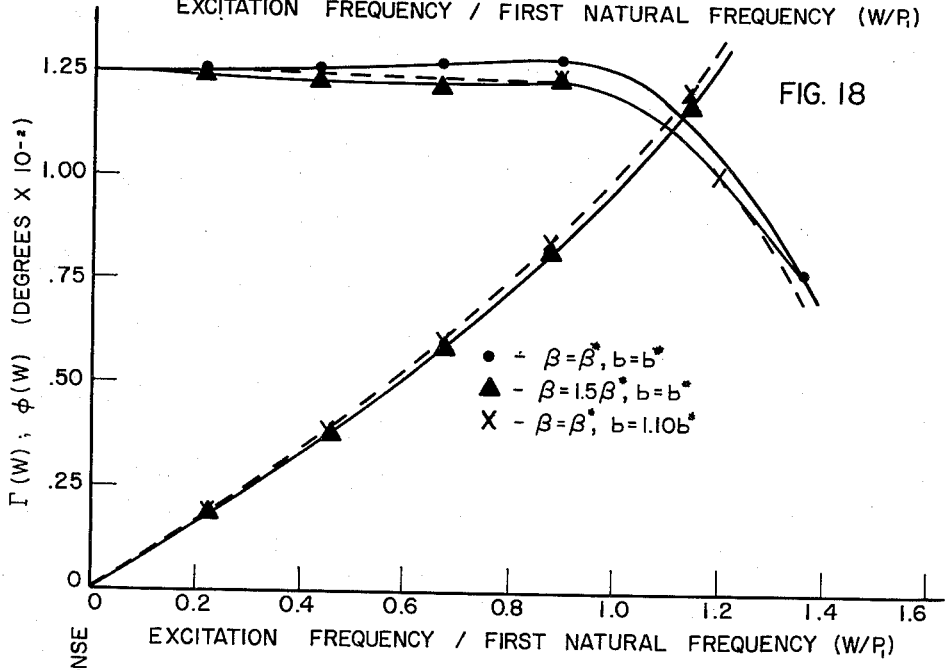
FIGURE 18 is a chart indicating sensitiviy of amplitude and phase shift characteristics to small changes in damping for $E=0.5$.

FIGS. 16 and 17 are the amplitude and phase shift characteristics, corresponding to the values of $\epsilon$ in FIG. 15, for which $a^*=0$. Positive values of the leading term in the expansion of the above series produce a hump in the curves for $\epsilon=0.1, 0.5, 1.0$. This is especially noticeable for $\epsilon=0.5$. The point for $\epsilon=1.444$ is especially interesting since both $a^*$ and $b^*$ are zero. FIG. 18 shows the effect of slight changes in the parameters from $\beta^*$ and $b^*$. The sensitivity to a change in $\beta$ is shown. It is seen that a 5 percent decrease in the value of $\beta$ from the value $\beta$ for $\epsilon=0.5$ results in a maximum change in the amplitude characteristic of about 2 percent and slight modification to the phase shift in the region of interest. For $\epsilon=0.5$ the value of $b$ was increased by 10 percent over $b^*$ and the corresponding $\beta^*$ calculated. The result is only a slight modification to the characteristics.

Let us now compare the characteristics of these two degree of freedom instruments with those obtainable in a single degree of freedom system. It is seen in FIGURE 20 that the amplitude characteristics, especially for the larger values of $\epsilon$, are far superior to a conventional single degree of freedom system. In order to evaluate the gain made by the use of the two degree of freedom system, we must consider the relative importance of maintaining the flat amplitude characteristic as opposed to maintaining the linear phase shift characteristic. This can be done very simply as follows: Consider the curve in FIG. 17 for $\epsilon=1.0$. This is the most non-linear in the range of flat amplitude characteristic, which in this case exists up to about 1.4 times the first natural frequency. If the super-position of any two harmonics in an excitation to be measured in this range is considered, the non-linearity of the phase shift characteristic will cause a relative shift of these harmonics by the accelerometer of about 20 degrees in the motion of the higher harmonic, in the worst case. This corresponds to a relative time shift of about 5½ percent of the period of the higher frequency harmonic. In terms of usual engineering accuracies, deviations in linearity which are usually much smaller than this value of 20 degrees may be ignored. Conclusions as to usable frequency range can therefore be based on the amplitude characteristic alone.

Figure 19:
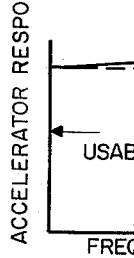
FIGURE 19 is a chart indicating the usable range of accelerometer.

Arbitrarily, the amplitude characteristic for 65 percent of critical damping in the single degree of freedom case will be used as a reference. Based on a total spread of the amplitude characteristic (see FIG. 19) of 2.5 percent, the usable range is 0.62 of the natural frequency. If the damping is modified slightly for the curves of FIG. 16 to obtain about the same order and type of spread (+1.25 to −1.25 percent approximately), the usable ranges shown in Table I are obtained. As a basis for comparison, the sensitivity to acceleration for equal usable frequency ranges will be considered.

For a single degree of freedom accelerometer to be usable over the same frequency range as a superior two degree of freedom instrument, its natural frequency $P'$ must be higher than the first natural frequency of the two degree of freedom instrument. The sensitivity of the single degree of freedom instrument is then $1/P'^2$. The sensitivity of the two degree of freedom accelerometer is $\Gamma_0/P_1^2$. This if $S$ is defined to be the gain in sensitivity, its value will be $\Gamma_0 P'^2/P_1^2$. Values of $S$ also appear in Table I.

TABLE I

| $\epsilon$ | Usable Range, First Natural Frequency | $\frac{P'}{P_1}$ | $\Gamma_0$ | $S$ |
|---|---|---|---|---|
| 0.1 | 0.97 | 1.57 | 1.5333 | 3.8 |
| 0.5 | 1.27 | 2.05 | 1.250 | 5.3 |
| 1.0 | 1.35 | 2.18 | 1.146 | 5.4 |
| 1.444 | 1.25 | 2.02 | 1.102 | 4.5 |

Hence it is possible to increase the accelerometer sensitivity from 3.8 to 5.4 times for the same useful frequency range by use of a two degree of freedom instrument.

SUMMARY AND CONCLUSIONS

Any transient can be considered as a superposition of a continuous distribution of harmonics. The steady-state characteristics of an accelerometer describe the manner in which each of these harmonics is altered by the instrument. An ideal accelerometer must have an amplitude characteristic which has a constant value, and a phase shift characteristic which has a constant slope, in the frequency range in which harmonics in the excitation exist.

The correct reproduction of the peak value of a transient has often in the past been used as a measure of the accuracy of an instrument. Application of this peak-value criterion to acceleration pulses shows that the "optimum" accelerometer design may not be the one whose characteristics closely approximate the ideal over the largest frequency range. The peak value criterion has merit only if the measurement is to be used to determine the peak response of a structure which responds statically to the excitation.

To the extent that one is interested in the peak response of single degree of freedom structures, or the peak response of normal modes of complex structures, the correct reproduction of the response spectrum of the excitation is a resasonable criterion for instrument design. The response spectrum criterion permits a quantitative evaluation of the degree to which the accelerometer characteristics approximate the ideal.

The required useful accelerometer frequency range need not always be based on the harmonic content of the excitation. The extent of this range may be, in some cases, modified by the sensitivity to harmonics of particular frequencies. Harmonics to which the structure will not significantly respond need not be recorded.

Treatment of a multiple degree of freedom seismic system leads to the result that significant improvement can be attained in the two degree of freedom case. The sensitivity to acceleration can be increased to about five times that of a single degree of freedom instrument having the same useful frequency range. It is shown for the systems treated that the phase shift characteristic is not as significant as the amplitude characteristic for determining the useful frequency range.

Reference is now directed to FIGURE 2. In this and subsequent figures, the mathematical designations $m$, $k$, and $c$ with their subscripts are applied to the appropriate elements to correlate with FIGURE 1. However, the usual reference characters are also applied for physical identification of the parts.

FIGURE 2 illustrates diagrammatically a linear accelerometer. In this embodiment of the invention there is provided a cup-shaped bottom member 2 which supports a circular intermediate member 3 which in turn supports a cover member 4. Clamped between the cover member and intermediate member are spring elements 5 which may be in the nature of cantilever springs or may be a single diaphragm element. Similar spring elements 6 are clamped between the intermediate member 3 and the bottom member 2. The spring elements 5 whether constituting a pair or more of cantilever leaf springs or a single diaphragm support in centered relationship with the side walls formed by the intermediate member 3 a weight member 7. A weight member 8 is similarly supported by the spring elements or element 6. A coil spring 9 is interposed between the weight elements 7 and 8.

It will thus be seen that the weights 7 and 8 correspond to the masses $m_1$ and $m_2$ and that the springs 5 and 9 and 6 correspond respectively to the designations $k_1$, $k_2$ and $k_3$ of FIGURE 1. The movement of the weight members 7 and 8 will therefore correspond to the movements of the $m_1$ and $m_2$. By selection of optimum values for the spring constants $k_1$, $k_2$, and $k_3$ improved performance characteristics will be attaiend or other desired special performance characteristics may be attained.

Measurement of the movement of the weight member 8 may be accomplished by several means. For example, the weight member 8 may include an armature 10 which moves relative to a fixed magnet yoke 11 mounted on a suitable support 12 and having a pick up coil 13, the leads of which are suitably connected to a detector circuit 14 which in turn is connected in a conventional manner to amplifier 15 and indicator or recorder 16. The desired damping of the system is accomplished by filling the casing formed by the members 2, 3 and 4 with a suitable viscous fluid and also by choice of the shape and dimensions of the weight members and spring elements.

Reference is now directed to FIGURE 3. The construction here shown is adapted to the measurement of torsional or angular acceleration. This construction includes a mounting base 21 in which is fitted a bearing 22 which supports a shaft 23, the movement of which it is desired to measure. Extending from the shaft 23 is a torsion tube 24 which carries at its extremity a weight 25. A second torsion tube 26 continues co-axially with the torsion tube 24 and carries at its extremity a weight 27. Angular acceleration of the shaft 23 is measured by relative deflection of the weight 27 with respect to the mounting base 21. This may be measured by any suitable conventional means. For example, a mirror 28 arranged to reflect a beam of light may be utilized. The weights may be provided with vanes 29 for the purpose of damping the system. In addition the weights and torsion tubes may be enclosed in a case 30 and the case filled with a liquid or gas for further control of the damping coefficients of the system. In such event an appropriate window is provided in the case 30 for the observation of the deflection of the mirror 28. It will thus be seen that the weights 25 and 27 correspond to the masses $m_1$ and $m_2$ and that the torsion tubes 24 and 26 correspond to the spring constants $k_1$ and $k_2$.

Reference is now directed to FIGURE 4. The construction here illustrated is arranged to measure dynamic pressures. A tubular fitting 31 is connected to a fluid system, the dynamic pressure of which is to be measured. The fitting 31 receives a cap 32 which may serve to clamp a diaphragm 33 between the fitting and cap. The diaphragm may be such as to have inherently a mass representing the mass $m_1$ of the system. However, for purposes of illustration, a weight 34 is shown representing such mass. Extending from the diaphragm 33 is an annular spring element 35 which is shown as generally cone-shaped and terminating at its larger end or extended end in an end plate 36. The end plate is disposed contiguous to a fixed plate 37, suitably mounted on a support 38. The plates 36 and 37 may constitute a capacitance which is appropriately connected to an indicating or recording circuit so that movement of the end plate 36 may be detected or measured. In this system it will be seen that the diaphragm 33 and spring element 35 have spring coefficients $k_1$ and $k_2$ respectively and that the weight 34 whether a part of the diaphragm 33 or a separate element and the end plate 36 constitute the masses $m_1$ and $m_2$ respectively. Again damping may be affected by a fluid filling or partially filling the cap 32.

Reference is now directed to FIGURES 5 and 6 which illustrate a galvanometer embodying the invention. In this construction torsion springs 41 and 42 support a coil mount 43 between fixed supports 44 and 45. Mounted on the first coil mount 43 is a torsion tube 46 which is shown as formed of rubber or other elastomer. The torsion tube 46 supports a second coil mount 47 on which may be mounted a galvanometer mirror 48. A first coil 50 is carried by the first coil mount 43 and a second coil 49 is carried by the second coil mount 47. Both coils are located between pole pieces 51 and 52. The torsion springs 41 and 42 may serve as conductors and the coils 49 and 50 are electrically connected in parallel as indicated in FIGURE 6.

In this embodiment of the invention the torsion springs 41 and 42 represent the spring constant $k_1$, the torsion tube 46 represents the spring constant $k_2$ whereas the first coil 50 and mount 43 represents the mass $m_1$ and the second coil 49 which may have different electrical constants and mount 47 represent the mass $m_2$. Damping may be of the type normally provided for galvanometers.

Having thus described certain embodiments and applications of my invention, I do not desire to be limited thereto, but intend to claim all novelty inherent in the appended claims.

I claim:

1. A dynamic force measuring instrumentality, comprising: at least two mass defining elements similarly responsive in direction to the same dynamic force; at least two means having predetermined spring constants one of said means connecting one of said elements to a fixed support and the other joining said elements; the spring constants of said means and the masses of said elements being such that one of said mass defining elements has a greater magnitude of movement than the other; and means for detecting movement relative to said support of the element having the greater magnitude of movement.

2. A dynamic force measuring instrumentality, comprising: a support; $n$ number of mass defining elements; $n$ number of means having preselected spring constants, connecting said elements in series; the initial means being connected to said support; said "$n$" being a whole number not less than 2; the spring constants of said means and the masses of said elements being such that the $n$th element has the greater magnitude of movement; and means for detecting movement of the $n$th element relative to said support; all of said mass defining elements having the same directions of movement and similarly responsive directionally to the same dynamic force.

3. A dynamic force measuring instrumentality, comprising: a support, a plurality of mass defining elements, devices having spring constants, connected to said support and to said mass defining elements in tandem, and means having damping coefficients interconnecting said mass defining elements in tandem, wherein said elements, devices and means are related in accordance with the following formula:

$$m_n \frac{d^2 Z_n}{dt^2} + c_n \left( \frac{dZ_n}{dt} - \frac{dZ_{n-1}}{dt} \right) + k_n (Z_n - Z_{n-1})$$

$$+ c_{n+1} \left( \frac{dZ_n}{dt} - \frac{dZ_{n+1}}{dt} \right) + k_{n+1}(Z_n - Z_{n+1}) = f_n$$

where $M_n$ = mass of weight $m_n$
$Z_n$ = relative displacement of $m_n$ $t$ = time
$c_n$ = damping coefficient
$k_n$ = spring constant of $n$th spring and $f_n$ = force applied to weight of $m_n$ 4. A dynamic force measuring device as set forth in claim 1 wherein: said spring constant means are coaxial torsion spring and said mass defining elements are weights carried by said torsion springs for angular displacement about the axis of said torsion springs and said detecting means is responsive to angular displacement of said second mass defining element.

5. A dynamic force measuring device as set forth in claim 1 wherein: said spring constant means are spring elements and said mass defining elements are weight elements collectively defining a yieldable partition exposed to a pressure fluid.

6. A dynamic force measuring device as set forth in claim 1 wherein: said spring constant means are spring elements, said mass defining elements are electrical coils, and are disposed in a magnetic field.

7. A dynamic force measuring device as set forth in claim 3, wherein: said devices having spring constants are co-axially torsion springs and said mass defining elements are weights carried by said torsion springs for angular displacement about the axes of said torsion springs.

8. A dynamic force measuring device as set forth in claim 3, wherein: said mass defining elements are weight elements collectively defining a yieldable partition exposed to a pressure fluid.

9. A dynamic force measuring device as set forth in claim 3 wherein: said mass defining elements are electrical coils and are disposed in a magnetic field.

References Cited in the file of this patent

UNITED STATES PATENTS

| | | |
|---|---|---|
| 2,268,495 | Petty | Dec. 30, 1941 |
| 2,272,984 | Ritzmann | Feb. 10, 1942 |
| 2,276,580 | Hofer | Mar. 17, 1942 |
| 2,637,999 | Klebba | May 12, 1953 |
| 2,783,643 | Sihvonen | Mar. 5, 1957 |
| 2,835,774 | Statham | May 20, 1958 |
| 2,838,137 | Wallerstein | June 10, 1958 |
| 2,839,922 | Manildi | June 24, 1958 |

OTHER REFERENCES

An article entitled, "Accelerometers for Determining Aircraft Flight Loads" by J. Taylor published in Engineering, pages 473–475, April 11, 1952 and concluded on pages 506 and 507, April 18, 1952.